Dec. 20, 1966  E. A. WARD  3,292,547

PRESSURE-ACTUATED PUMP CONTROL MECHANISMS

Filed Nov. 2, 1965  5 Sheets-Sheet 1

INVENTOR.
ERNEST A. WARD
BY
Robert W. Beach
ATTORNEY

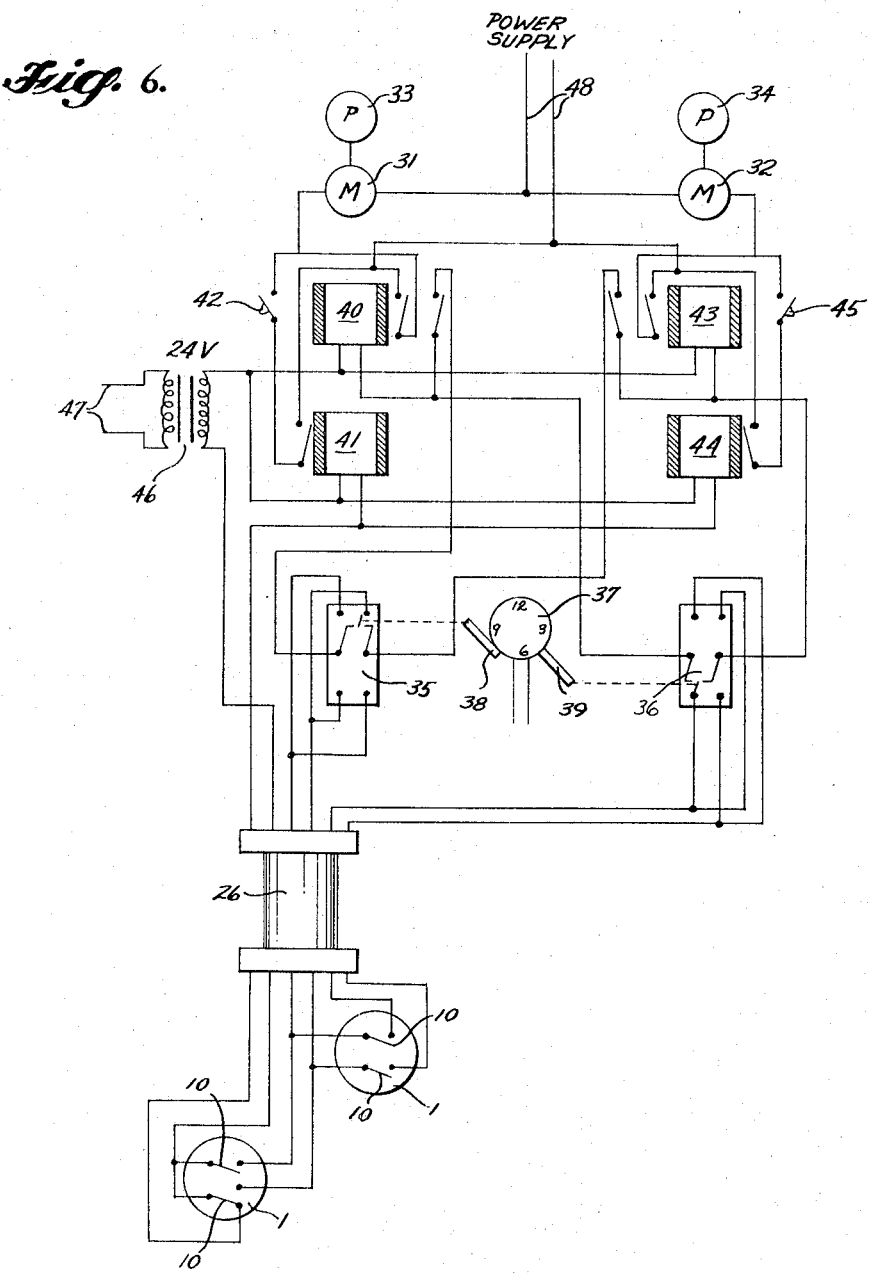

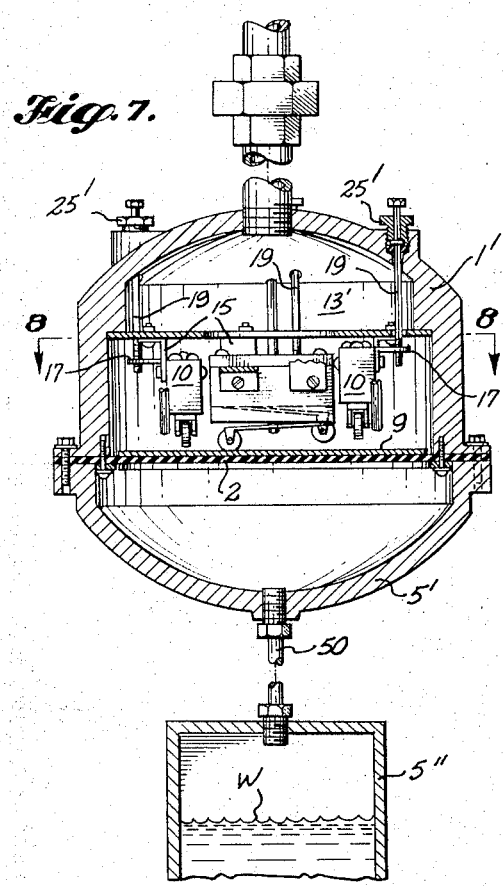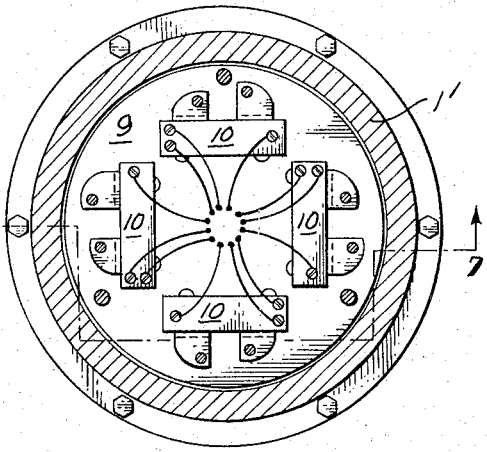

Dec. 20, 1966 E. A. WARD 3,292,547
PRESSURE-ACTUATED PUMP CONTROL MECHANISMS
Filed Nov. 2, 1965 5 Sheets-Sheet 5

INVENTOR.
ERNEST A. WARD
BY Robert W. Beach
ATTORNEY

United States Patent Office 3,292,547
Patented Dec. 20, 1966

3,292,547
PRESSURE-ACTUATED PUMP CONTROL
MECHANISMS
Ernest A. Ward, 4851 S. Raymond, Seattle, Wash. 98118
Filed Nov. 2, 1965, Ser. No. 506,065
4 Claims. (Cl. 103—11)

This is a continuation-in-part of my application Serial No. 430,278, filed February 4, 1965, for Pressure-Actuated Pump Control Mechanism. This invention relates to control mechanism for a pump, or pumps, which is actuated by the pressure of liquid to be pumped and preferably effects its control function by switch actuation to energize or deenergize appropriate electric circuits.

Control mechanism of this type is particuarly useful for controlling the energization and deenergization of motors connected to drive pumps for pumping liquid from a sump, such as in a sewage line or from a reservoir. The purpose of such control mechanism is to initiate operation of a pump or pumps when the liquid level has risen to a predetermined height and to deenergize a pump or pumps when the liquid level in the sump or reservoir has been lowered to a predetermined height or heights.

A principal object of the invention is to provide such pump control mechanism which will operate in response to fluid pressure, rather than being actuated by a float, for example, and which will be accurate and automatic in its operation. A more specific object is to enable such mechanism to be adjusted easily for initiating operation of the pumping mechanism, or deenergizing the pumping mechanism at different liquid levels. It is preferred that such control mechanism be sealed from access by the liquid in the sump or reservoir, yet it should be possible to make such adjustments without requiring direct access to the control mechanism.

Another object is to provide such pump control mechanism which can control the operation of a plurality of pumps and effect energization of different pumps sequentially, rather than simultaneously, and deenergize such pumps sequentially instead of simultaneously to avoid the occurrence of water hammer. It is also an object in such a system utilizing a plurality of pumps to provide timing mechanism which will schedule different pumps to be the primary or first pump to be energized, so as to equalize the wear on the pumps while still providing a plurality of pumps for primary and standby operation.

Another object is to provide a safety feature in the control mechanism which will prevent any pump being started either automatically by the control mechanism, or manually, if the liquid in the sump or reservoir is so low that a pump to be energized could not pump liquid and the pump is of the type which might be injured by operation without hydraulic load.

A further object is to provide such control mechanism which will be of simple and rugged construction and reliable in operation, yet which can be replaced quickly and easily in the event that it should fail for any reason.

An additional object is to provide such mechanism which will be economical to manufacture and inexpensive to install.

Mechanism capable of accomplishing these various objects includes control switch mechanism received in one or more bells, including diaphragms subjected to fluid pressure corresponding to the level of liquid in the sump or reservoir from which the liquid is to be pumped. Such switch mechanism can be adjusted within the bell so as to be actuated in response to the occurrence of a greater or lesser selected pressure, and such adjustment can be accomplished by altering the position of an adjusting screw connected to the switch mechanism within the bell and extending through the wall of the bell. Such switch mechanism is connected in the control circuit of a pump-driving motor or motors so as to start a motor when the depth of liquid in the sump or reservoir exceeds a predetermined level and the motor is stopped when the liquid level has been lowered to reduce the pressure to which the bell is subjected to a predetermined value. Also connected in the motor-energizing circuit is timing mechanism for causing the various motors of a plurality of motors to be energized in different sequences. Moreover, safety mechanism will prevent any motor being started, even by manual switch actuation, when the depth of liquid is below a predetermined level.

FIGURE 1 is a longitudinal section through a pressure bell housing taken on line 1—1 of FIGURE 3 and FIGURE 2 is a longitudinal section through the housing taken in a plane perpendicular to FIGURE 1 on line 2—2 of FIGURE 3. FIGURE 3 is a transverse section through the housing on line 3—3 of FIGURE 1.

FIGURE 6 is a wiring diagram of the control mechanism including switches mounted in upper and lower bell housings.

FIGURE 7 is a vertical section on line 7—7 of FIGURE 8 and FIGURE 8 is a horizontal section on line 8—8 of FIGURE 7 of modified control mechanism. FIGURES 9, 10, 11 and 12 are wiring diagrams of variations in the control mechanism circuit.

In the past it has been general practice to control pump motors driving sump pumps by the use of float switches. Such float switches required a float floating on the body of liquid in the sump which was mechanically connected to some type of switch-actuating mechanism. If such floats were subjected to the impact of inflowing liquid they could be subjected to rather severe shock. Also, sometimes a float would be jammed, or parts connected to the float would corrode, so that the float did not work properly. Float control switches were therefore not very satisfactory. Attempts have been made to substitute other types of actuating mechanism for float control mechanism, but such substitute devices for the most part have been delicate or expensive, or had some other disadvantage.

Considerable trouble is avoided in pump motor control mechanism by utilizing the variation in fluid pressure resulting from a change of level in the body of liquid to be pumped. Actually, while the mechanism of the present invention was designed primarily to control a pump for removing liquid from the body, the same type of mechanism could be employed connected into the motor control system somewhat differently to supply liquid to the body when it dropped below a predetermined low level, instead of removing liquid from the body when it rises to a predetermined high level.

Figure 1:
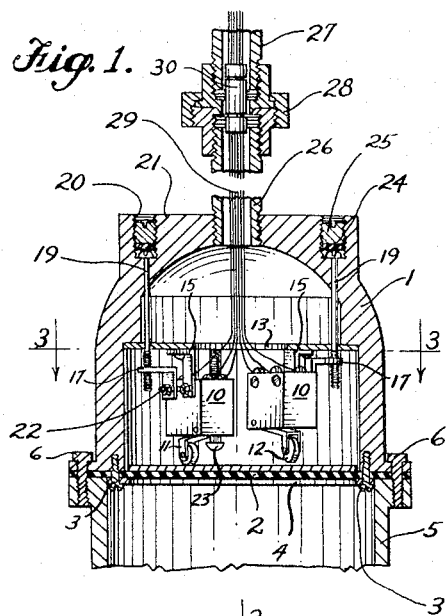
Figure 2:
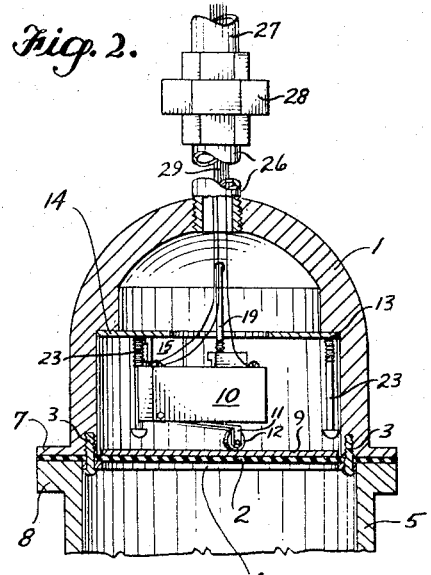
Figure 3:
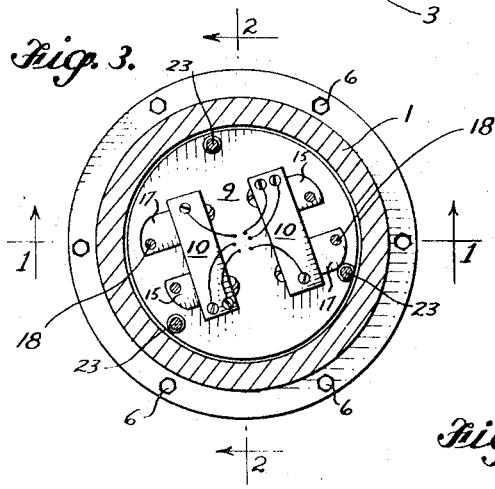

The liquid level sensing component of the mechanism is the bell 1 shown in FIGURES 1, 2 and 3, the mouth of which is closed by a flexible diaphragm 2 preferably formed by a membrane of rubber material. To deter deterioration by petroleum products which may adulterate the liquid, in a sewage sump, for example, it is preferred that this membrane be made of neoprene or equivalent synthetic rubber material. This diaphragm is secured by machine screws 3 to the lip of the bell and may be held in place by the flat ring 4 to maintain a liquid-tight joint around the mouth of the bell.

When the mouth of the bell is sealed by the diaphragm 2 the bell can, if desired, be submerged in liquid without such liquid seeping into the interior of the bell. By this expedient hydraulic pressure of the liquid body can be applied directly to the diaphragm. Alternatively, an extension pipe 5 can be secured by bolts 6 to a flange 7 encircling the lip of the bell 1. Such extension pipe can be submerged directly in the wet well. Alternatively such pipe can be located in a dry well with the interior of its lower end in communication with the wet well. Several switch bells 1 can be mounted on Y's in such a pipe at different levels. The diaphragm 2 can be sufficiently large to be clamped between the flange 8 of the pipe extension 5 and the flange 7 of the bell 1 by the bolts 6 interconnecting them to form a fluid-tight joint.

Figure 4:
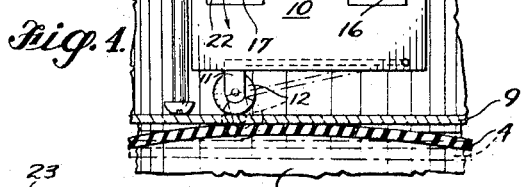
FIGURE 4 is a fragmentary section through a portion of the housing on a larger scale and FIGURE 5 is a fragmentary section through a different portion of the housing on a larger scale.

If the end of the pipe extension 5 is now submerged in a body of liquid and its lower end is at a depth an appreciable distance below the surface of the liquid, such liquid will rise above the lower end of the pipe extension to a level below the surface of the liquid body and in doing so will compress the gas in the pipe extension so that such gas will exert on the diaphragm 2 a pressure equal to that which would be exerted on the diaphragm if it were located at the same depth as the lower end of the pipe extension. When the diaphragm is subjected to pressure, whether the pressure of compressed gas in the extension 5 as discussed above, or to hydraulic pressure directly, the diaphragm will be deflected inwardly as represented in FIGURE 4. It is preferred that such inward deflection of the diaphragm press against and effect inward movement of the backing plate 9 located within the bell, but in engagement with the diaphragm as shown in FIGURES 1, 2, 4 and 5.

Within the bell 1 is received a switch 10 having a switch actuating arm 11 positioned so that a roller 12 carried by its end portion will engage the backing plate 9. Such backing plate should be made of metal or other hard material so that when the diaphragm is deflected inward the backing plate will exert a positive force on the switch arm roller which will swing such arm relative to the switch body from the phantom line position shown in FIGURE 4 to the solid line position of that figure. The body of the switch 10 should be mounted stationarily in the bell 1 so that the movement of the diaphragm 2 and backing plate 9 will effect movement of the switch arm relative to the switch, instead of moving the switch as a whole.

Depending upon the particular type of control operation for which the switch mechanism is to be used, it will be desirable to effect predetermined movement of the switch arm 11 relative to the switch 10 for different degrees of deflection of the diaphragm 2. Consequently, it is desirable to mount the switch 10 adjustably within the bell 1. For this purpose an appropriate switch mounting arrangement includes the ring 13 which is secured to an annular shoulder 14 within the central portion of the bell. A bracket 15 is secured to this ring, as shown in FIGURE 4, projecting from it to constitute a mounting for a pivot 16 secured to the switch at a location remote from the swinging end of the switch arm 11. If the switch body is tilted about this pivot, therefore, the swinging end of the switch arm will be moved farther from or closer to the diaphragm.

Mechanism for adjusting the position of the switch 10 about its pivot 16 includes a further bracket 17 secured to the switch at a location spaced a substantial distance from the pivot and preferably located adjacent to the swinging end portion of the switch arm 11. This bracket has in it a hole, the axis of which extends transversely of the axis of pivot 16 and preferably such hole is threaded. The threaded end of a switch-adjusting screw 18 is then screwed into the hole of the bracket 17 and the length of such screw also extends generally transversely of the axis of pivot 16. This adjusting screw may be of sufficient length to extend through the wall of the bell 1 and preferably is located adjacent to the side of the bell, as shown in FIGURE 1.

Such screw may extend through an aperture 19 in the end wall of the bell in alignment with a cavity 20 formed in a boss 21 projecting from the bell end. The head of the screw is received in the recess 20 and bears against the bottom of such recess so that the screw can be turned in one direction or the other to move its threaded end relative to the bracket 17 and thus shift the portion of the switch to which such bracket is attached. During such movement the threaded flange of the bracket 17 must remain perpendicular to the length of the adjusting screw, although the switch is being tilted around pivot 16. Consequently, the bracket 17 should be secured to the switch by a pivot 22, shown in FIGURES 1 and 4, enabling the switch to tilt relative to the bracket in the manner indicated by the arrows in FIGURE 4.

Figure 5:
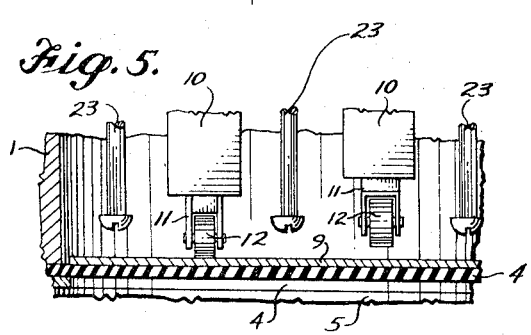

It may be desirable for various applications to make the bell 1 large enough to accommodate at least two switches 10, as shown in FIGURES 1 and 3. These switches can, of course be adjusted independently by their adjusting screws 18 so that as shown in FIGURE 5 the roller 12 of one switch may be located farther from the diaphragm 4 than the other switch roller. The same backing plate 9 can, however, effect switch-actuating movement of the arms 11 of both switches because the switch arm first engaged will have a construction enabling sufficient overtravel of its switch arm beyond switch-actuating position so that the other switch arm can be moved into switch-actuating position if the difference in the adjusted positions of the switches is not too great. Such difference may, for example, effect switch-actuating movement of the lower switch arm when the liquid level is approximately one foot lower than necessary to produce sufficient pressure on the diaphragm 4 to move the switch arm 11 of the other switch into switch-actuating position. The inward travel of the diaphragm and backing plate can be limited in a desired position by stop screws 23 spaced circumferentially of the bell and threaded into its side wall at the location of the shoulder 14.

Except when it is desired to adjust the position of one of the switches 10, it is desirable to seal the cavities 20 in which the heads of adjusting screws 19 are received. Such cavities can be closed by placing in them rubber disks 24 and then screwing into the cavities screw-threaded plugs 25. The wires from the switch or switches 10 leading to the control mechanism pass from the inside of the bell 1 through conduit 26 screwed into a threaded aperture in the bell. A junction between such conduit and a further conduit 27 is located close to the bell and the conduits are connected by a union 28 which can be disconnected quickly to enable the bell to be removed and replaced by a substitute bell. The wires 29 from the switches 10 passing through the conduits 26 and 27 can be joined at the location of the union 28 by a quickly disengageable connector 30, which will maintain all of the wires 29 in proper relationship at opposite sides of the connector. To change the bell, therefore, it is merely necessary to remove bolts 6, to disconnect the bell flange 7 from the pipe extension flange 8, disconnect the union 28 and the wire connection 30, and substitute a different bell with the switches in place in it by following the reverse procedure.

In the wiring diagram of FIGURE 6 two bells 1 are represented diagrammatically, one of which would be subjected to pressure near the top of a sump or reservoir and the other to the pressure near the bottom of a sump or reservoir, at locations corresponding generally to high and low levels of liquid in the sump or reservoir. Also, the conduit 26 through which the wires pass from the switches 10 to the control mechanism is represented diagrammatically. While the bell and switch component described above could be utilized in a different control circuit arrangement, it is particularly useful in the control circuit of FIGURE 6. The control apparatus shown in this diagram will control the operation of two motors 31 and 32 driving two pumps 33 and 34, respectively, both of which are located to pump liquid from a sump in response to pressures to which the upper and lower switch diaphragms are subjected.

In describing the integration of the switching mechanism of the bells 1 into the wiring diagram, the "upper bell" 1 will be understood to be the bell subjected to pressure of liquid at the level in the sump at which it is desired to energize the pump motors 31 and 32, and the term "lower bell" will be used to designate the bell subjected to pressure in the sump corresponding to the level at which it is desired to have the pump motors 31 and 32 deenergized for termination of a pumping operation. Also, in each of these bells one switch is adjusted to a position higher than the other so that the switches will not be actuated at the same time, as shown in FIGURE 5, and these switches in each instance will be designated as the higher switch and the lower switch. Also included in the circuit are double-pole, double-throw reversing switches 35 and 36 controlled by timing mechanism 37, such as a clock, for the purpose of enabling one of the pump and motor combinations to be the primary combination and the other pump and motor combination to be the second one energized. The clock 37 will be provided with suitable cams 38 and 39 connected to the switches 35 and 36, respectively, so that when the switch 35 is in the upper position the switch 36 will be in its lower position and vice versa.

The motor 31 is started by starting relay 40, or when the relay 41 is deenergized so that its normally-closed switch is closed may be started by a manual switch 42. Motor 32 is started by starting relay 43, or when relay 44 is deenergized may be started by a manual switch 45. The power for energizing these relays is supplied by a transformer 46 connected to a control power source 47, while the power for the motors 31 and 32 is supplied through the power supply 48.

Assuming that the liquid level in the sump or reservoir is very low, the switches 10 would be in the positions shown in FIGURE 6, namely, the lower switch of the lower bell would be in engagement with its lower contact and the other three switches would be open. Under these conditions a circuit would be completed through the lower switch of the lower bell from the transformer 46 to both relays 41 and 44, so that their switches would be held open, thus preventing a completion of the circuit to either motor 31 even if its switch 42 is closed, or motor 32 even if its switch 45 is closed. The entire system would thus be maintained in deenergized condition as long as the lower switch of the lower bell is in the position shown in FIGURE 6.

As the liquid level in the sump or reservoir rises the diaphragm 4 of the lower bell 1 would be deflected to actuate the switch arm 11 of the lower switch for moving it into engagement with the upper contact. Disengagement of the lower switch of the lower bell from its lower contact will deenergize relays 41 and 44 so that the normally-closed switches of these relays will close.

Assuming that, as shown in FIGURE 6, the switch arm of the switch 35 is in its upper position and the switch arm of switch 36 is in its lower position, as soon as the lower switch of the lower bell engages its upper contact a circuit will be completed from the transformer 46 through the switch 35 to the holding switch of relay 43 so that motor 32 will be conditioned for energization, but will not be energized. When the level of the liquid continues to rise and increase the pressure on diaphragm 4 of the lower bell until the upper switch 10 of the lower bell is closed, a circuit will be closed from transformer 46 through switch 35 to the holding switch of relay 40, thus conditioning motor 31 for energization but not energizing it. In addition, such closing of the switches in the lower bell will condition the respective switches in the upper bell for energization, although they are still in the open condition.

When the liquid level in the sump or reservoir has increased sufficiently to exert pressure on the diaphragm 4 of the upper bell 1 to effect closing of its lower switch 10, a circuit will be completed to energize relay 43 which will close its motor-starting switch to energize motor 32 even though lower switch 35 is open. Operation of the pump 34, thus effected by motor 32, will lower the liquid level in the sump or reservoir until the lower switch 10 of the lower bell opens, which will break the holding circuit of relay 43 causing the motor control switch to open and deenergize motor 32. If the flow of liquid into the sump or reservoir had been sufficient so that the operation of pump 34 did not reduce the liquid level, but it continued to rise until the upper switch of the upper bell were closed, such switch closing will effect energization of relay 40 to close the motor-starting switch for motor 31 and place pump 33 also in operation. Such energization of relay 40 will also close its holding circuit switch so that this relay will remain energized through the upper switch 10 of the lower bell. With the two pumps operating, when the level of the liquid in the sump or reservoir has been reduced sufficiently far so that the upper switch of the lower bell opens, the holding circuit of relay 40 will be broken to deenergize motor 31, assuming that switch 42 is in the open position. As the liquid level continues to drop the lower switch of the lower bell will open to deenergize the holding circuit of relay 43 so that motor 32 and pump 34 will be deenergized a short time later than the deenergization of motor 31 and pump 33, and such switch will engage the lower contact to reenergize the safety lockout relays 41 and 44. Such sequential deenergization of the pumps will prevent water hammer.

If the timer 37 now reverses the positions of switches 35 and 36 so that the switch arm of switch 35 is in the lower position and the switch arm of switch 36 is in the upper position, closing of the upper contact of the lower switch of the lower bell will condition the holding circuit of relay 40 for energization so that when the lower switch of the upper bell is closed relay 40 will be energized to start motor 31 as the primary motor, instead of motor 32. As the liquid level rises to close the upper switch of the lower bell, the holding circuit of relay 43 will be conditioned for energization and if the upper switch of the upper bell is closed relay 43 will be energized to start motor 32 for operating pump 34 in addition to pump 33. The deenergizing sequence of the pumps also will be reversed, the motor 32 being deenergized by opening of the upper switch of the lower bell and the relay 40 and motor 31 being deenergized by opening of the contact of the switch arm of the lower switch of the lower bell with its upper contact. Either or both of the pumps may, of course, be started at any time by closing of the respective manual switches 42 and 45 provided that the lower switch of the lower bell is not in engagement with its lower contact, as previously explained.

The modified type of control mechanism shown in FIGURES 7 and 8 operates on the same general principles as described above. In this instance, however, the casing 1' has a closure 5' covering the side of the diaphragm 2 remote from plate 9 and switches 10 instead of the casing being an open bell. To the closure 5' is connected one end of a pipe 50, the opposite end of which is connected to the extension pipe 5", the lower end of which is immersed in the body of liquid the level of which is to be controlled by the pumping apparatus.

In this instance four switches 10 are mounted in the casing or bell 1' above the backing plate 9 overlying the diaphragm 2. These switches are mounted on the plate 13' by brackets 15 and the elevation of the switch arms of the several switches can be adjusted by turning the screws 19 corresponding to the respective switches which are threaded into the ears 17 of the respective switches. These screws 19 extend through nuts 25' threaded into the upper end of the bell 1'. It is the intention, as indicated in FIGURE 7, that the screws 19 be adjusted so that the backing plate 9 will engage the rollers of the several switch arms sequentially as the backing plate is raised by the diaphragm 2 as it is deflected into the bell.

It will be evident that with the modified switch mounting apparatus shown in FIGURES 7 and 8, each switch 10 can control a separate motor for a different pump. As the level of the water W increases in the extension pipe 5", which operates like a diving bell, the pressure of the liquid will be transmitted to the air in the extension pipe above the level of the liquid and the pressure thus exerted on the air will be transmitted through the pipe 50 into the chamber within the cover 5'. Such pressure will then be exerted on the diaphragm 2 in accordance with the liquid level so that the switches 10 will be closed in sequence depending upon their adjusted positions. As each switch is closed the pump motor corresponding to such switch will be energized. Consequently, the pumps will be started in sequence until four of them are in operation, if it is necessary to have this many operating in order to control the level of liquid in the sump in which the pipe extension 5" is immersed.

A preferred type of circuit arrangement for the switch mechanism shown in FIGURES 7 and 8 includes connecting the lowest switch in series with the other three switches, and the other three switches in parallel between the lowest switch and three pump motors, respectively. The power supply is then connected to the side of the lowest switch opposite the other three switches. When the level of the liquid in the sump is sufficiently low, the lowest switch will be open so that none of the three pump motors can be started. As the liquid level rises and closes the lowest switch, the other three switches are conditioned for operation. As the liquid level rises the three switches are closed in sequence to start their respective motors and as the liquid level drops, as a result of the pumping action, the uppermost switch opens first, thus deenergizing the last pump motor to be energized. If the liquid level continues to be reduced the second motor to be energized will next be deenergized and finally the first motor to be energized will be deenergized by opening of the next to the bottom switch.

Figure 9:
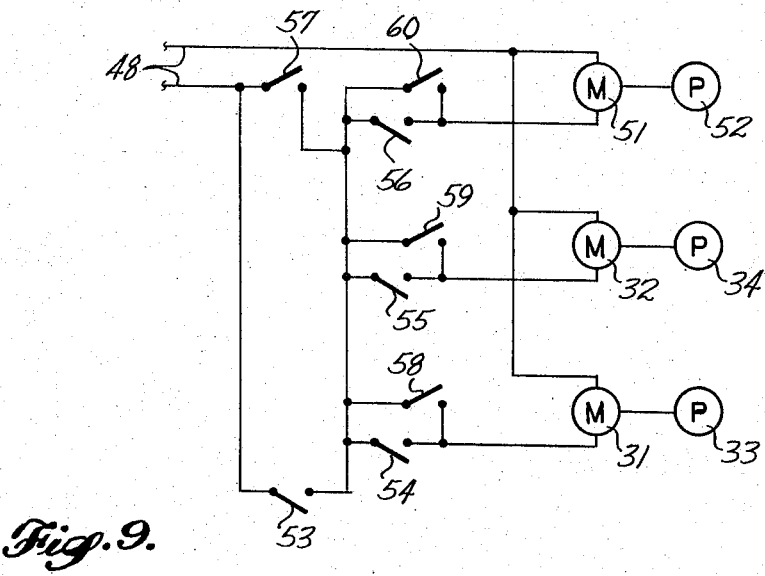

In FIGURE 9 a circuit diagram is shown for controlling the motors 31, 32 and 51 for three pumps 33, 34 and 52. In this instance, the lowest switch 53 is connected in series with the three switches 54, 55 and 56, which are connected in one electric line to the three motors 31, 32 and 51, respectively. Assuming that the liquid level is sufficiently low so that there is not enough pressure on the diaphragm 2 to hold closed the normally open switch 53, such switch will open so as to deenergize the circuit to all of the switches 54, 55 and 56. As the level of the liquid in the sump rises to effect closing of switch 53 by pressure on the diaphragm 2, the circuit will be conditioned for energization of one or more of the pump motors 31, 32 and 51. As the level of the liquid continues to rise, switches 54, 55 and 56 will be closed in sequence to start the motors 31, 32 and 51, respectively, in corresponding sequence to whatever extent is necessary to control the level of liquid in the sump.

As the level of the liquid in the sump is lowered by the pumping action, first switch 56 will be allowed to open because of the reduction in pressure on diaphragm 2 so that motor 51 will be deenergized, stopping pump 52. As the level of the liquid continues to descend, switch 55 will open next to deenergize the motor 32 of pump 34 and, finally, switch 54 will open to deenergize the motor 31 of pump 33. If the liquid level has been reduced sufficiently far, the safety-lockout switch 53 also will open.

In the event that it should be necessary to operate the motor of one of the pumps briefly for test purposes when water in the sump is so low that the safety-lockout switch 53 is open, it is possible to provide an arrangement to enable such operation to be effected. Manual switches which can be operated at will by the operator, bypassing the automatic liquid level-controlled switches 54, 55 and 56, are shown in the drawing. Thus, manual switch 58 is arranged in parallel with switch 54 so that it can be closed to energize motor 31 even when switch 54 is open. Similarly, manual switch 59 is located in parallel with switch 55 to enable motor 32 to be operated when switch 55 is open. Likewise, manual switch 60 is provided in the circuit of motor 51 is parallel with switch 56 so that this motor can be operated when the automatic switch 56 is opened.

When the level of the liquid in the sump has been lowered so far that the safety-lockout switch 53 opens, however, ordinarily it is not desirable for any of the pumps to be operated, and even if one of the switches 58, 59 and 60 have been closed by the operator, the motor controlled by it will be deenergized by opening of the safety-lockout switch 53. Under unusual circumstances, however, it may be desired to operate a motor for test purposes briefly when the safety-lockout switch 53 is opened. To enable such operation, a master manual bypass switch 57 can be provided in parallel with switch 53, which also is connected in series with the individual motor control switches 58, 59 and 60. To energize one of the motors 31, 32 and 51, when switch 53 is open, therefore, the corresponding manual switch 58, 49 or 60 is closed, and then the circuit to the particular motor or motors is completed by closing the master manual switch 57. Preferably, such master manual switch is of the normally-open momentary-contact type, so that it is not possible for switch 57 to be closed and inadvertently left closed. Thus, by such manual operation, any one or more of the pump motors could be operated only while the operator continued to hold the master manual switch 57 closed.

Figure 10:
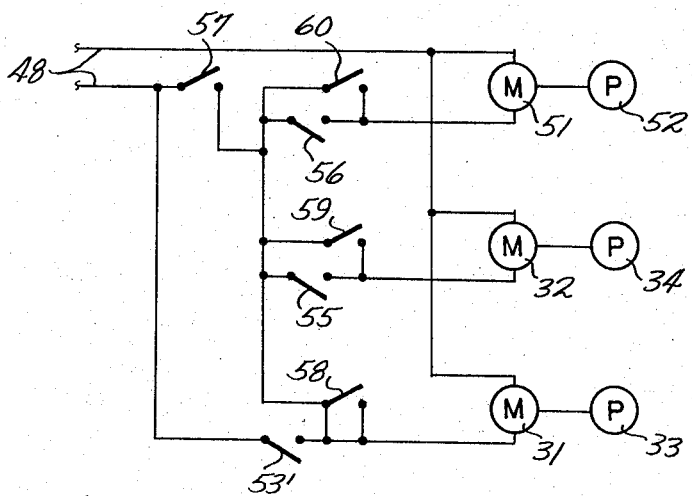

In FIGURE 10 the circuit illustrated is very similar to that of FIGURE 9, but in this instance, the lowest switch 53' operates in the dual capacity of a safety-lockout switch for the control circuits of all of the motors and, in addition, constitutes the direct control switch for motor 31. Thus, when this switch closes, the motor 31 will be energized whereas the circuits for motors 32 and 51 will be only conditioned for subsequent energization when their switches 55 and 56, respectively, are closed. Also, the motor 31 will be deenergized by opening of switch 53'. Since such switch 53' is arranged with respect to a diaphragm 2, to be actuated by the lowest degree of pressure on it, the motor 31 controlled by the circuit of FIGURE 10 will be the first motor to be energized and the last motor to be deenergized as it would be when controlled by the circuit of FIGURE 9.

The manual switches 57, 58, 59 and 60 can be operated to energize any of the motors 31, 32 and 51 in the manner described in connection with FIGURE 9.

Figure 11:
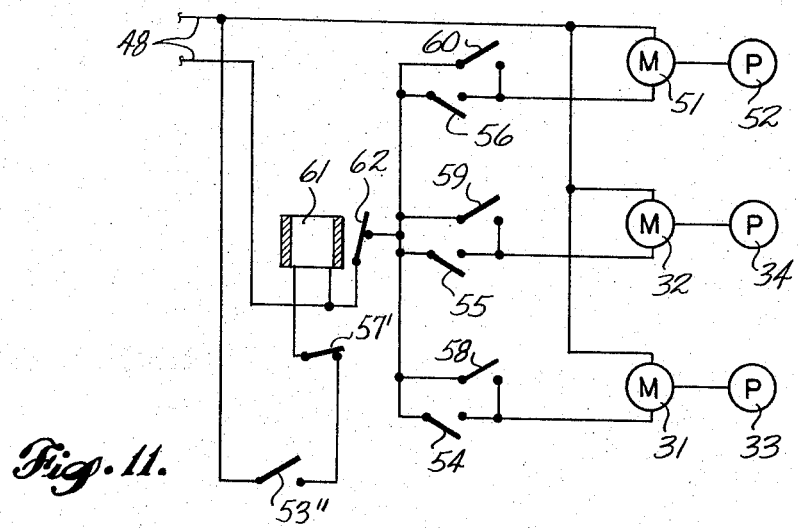

The control circuit shown in FIGURE 11 is similar to the control circuit of FIGURE 9, except that in this instance the safety-lockout switch 53", instead of breaking the motor circuits directly, energizes the coil of a relay 61 which will open the normally-closed switch 62. This safety-lockout switch in turn controls all the motor circuits under the control of both the automatic switches 54, 55 and 56 and manual switches 58, 59 and 60. In this case, therefore, the switch 53" will be closed, energizing relay 61 to hold switch 62 open, when the level of the water in the sump is very low. Sufficient increase in the water level will cause such switch to open so that the relay coil 61 will be deenergized to enable switch 62 to close for conditioning the motor circuits for operation.

If it should be desired to operate any of the motors 31, 32 and 51 by manual control while the water in the sump is so low that switch 53" is closed, thus maintaining relay 61 energized to hold switch 62 open, such manual operation can be made possible by providing the normally closed switch 57' in series with the normally closed switch 53". If the water in the sump is so low that switch 53" is closed, thus maintaining the coil of relay 61 energized, such relay coil can be deenergized by opening the switch 57' manually to release switch 62 for movement to closed position. In such a control circuit, it is very desirable for the switch 57' to be of the momentary-contact type for the reasons explained in connection with FIGURE 9 so that it would be necessary for the operator actually to hold this switch open in order to maintain the coil of relay 61 deenergized when switch 53" is closed. The requirement for such holding of switch 57' will insure that none of the motors 31, 32 and 51 will inadvertently continue to operate in response to manual actuation of control switches when the water is so low that the safety-lockout switch 53" is closed. When the manual switch 57' is held open, any of the motors 31, 32 and 51 can be started manually by closing the corresponding manual switch 58, 59 or 60 as described in connection with FIGURE 9.

Figure 12:
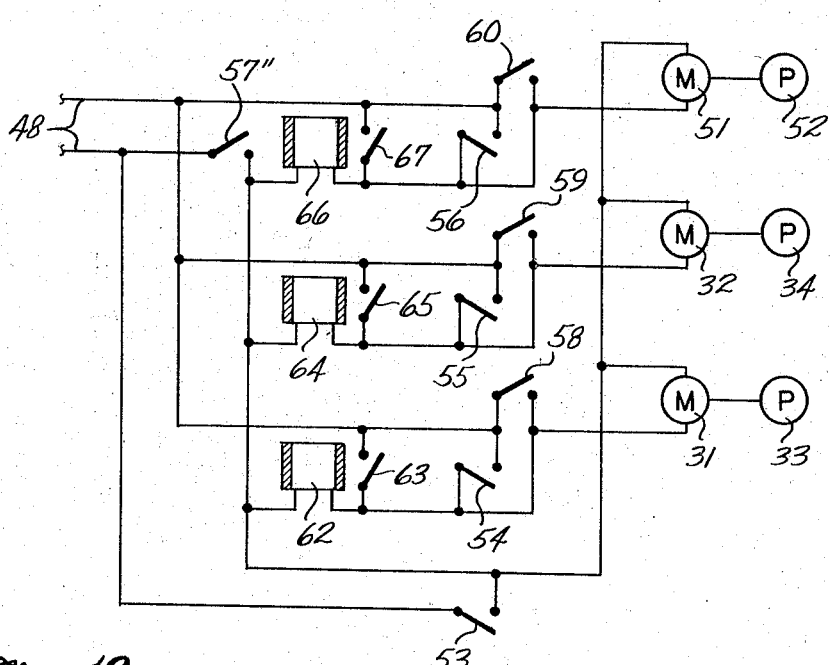

The control circuit shown in FIGURE 12 also resembles the control circuit of FIGURE 9, in general, since the safety-lockout switch 53 will interrupt the control circuits for all the motors 31, 32 and 51 for pumps 33, 34 and 52 when the water in the sump drops to a critically low level. In this instance, however, instead of the automatic control switches 54, 55 and 56 operating to start respective motors when they are closed and, also, to deenergize such motors when they are opened, relays are provided in the circuits of the several motors to maintain them energized after they are started until the water has been lowered far enough to enable switch 53 to open, whereupon all of the motors are deenergized simultaneously.

Relay 62, for holding motor 31 in operation, controls a switch 63 connected in parallel with switch 54. Relay 64, for maintaining motor 32 in operation, controls switch 65 connected in parallel with switch 55. Relay 66, for maintaining motor 51 in operation, controls switch 67 connected in parallel with switch 56. When the water level rises sufficiently to close switch 54, the motor 31 will be energized and simultaneously the coil of relay 62 will be energized to close the circuit-holding switch 63. Correspondingly, when the water level rises sufficiently to effect the closing of switch 55, the coil of relay 64 will be energized as well as motor 32 so as to close the circuit-holding switch 65. Similarly, when the water level rises sufficiently to close switch 56, coil 66 will be energized as well as motor 51 so that the holding switch 67 will be closed. Even though the water level drops far enough to enable switch 56 to open therefore, the circuit to motor 51 will remain completed through switch 67. Also, when switch 55 opens, the circuit to motor 32 will be maintained through switch 65. In the same way, when the water level drops sufficiently to enable switch 54 to open, the circuit of motor 31 will remain completed through switch 63. When the pumping action of the energized pumps is sufficient to reduce the water level to a point where switch 53 opens, however, the energizing circuits to all of the pump motors 31, 32 and 51 as well as to the coils of relays 62, 64 and 66 will be broken so that both the relays and the motors will be deenergized. Such motors and relays will not be reenergized until the switch 53 is again closed and one or more of the switches 54, 55 and 56 also closed.

If it should be desired to operate any of the pump motors 31, 32 and 51 by manual control, the appropriate manual switch or switches 58, 59 and 60 would be closed as described in connection with FIGURE 9. Switch 57" is located in the circuit in parallel with switch 53 so that after one or more of the switches 58, 59 and 60 have been closed to condition a pump motor or pump motors for operation closing of switch 57" will effect energization of the motor or motors. For the reasons discussed in connection with FIGURE 9, it is preferred that switch 57" be of the momentary-contact type so than none of the motors can be continued in operation inadvertently when the safety-lockout switch 53 is opened.

I claim:

1. Pressure-actuated control mechanism for a pump adapted to pump liquid relative to a sump, comprising an upper housing corresponding to a high liquid level in the sump, a lower housing corresponding to a lower liquid level in the sump, two pump-driving motor means for driving two pumps, respectively, a first pressure-actuated switch means received in said upper housing, subjected to the pressure of liquid in the sump at a first predetermined level of the liquid relative to said upper housing operatively connected to one of said pump-driving motor means and operated automatically in response to increase in the level of liquid in the sump to such first predetermined level to energize said one pump-driving motor means, a second pressure-actuated switch means in said upper housing, subjected to the pressure of liquid in the sump at a second predetermined level of the liquid relative to said upper housing higher than said first predetermined level, operatively connected to the other of said pump-driving motor means and operated automatically in response to increase in the level of liquid in the sump from such first predetermined level to such second predetermined level to energize said other pump-driving motor means, a third pressure-actuated switch means received in said lower housing subjected to the pressure of liquid in the sump at a first predetermined level of the liquid relative to said lower housing, operatively connected to one of said pump-driving motor means and operated automatically in response to decrease in the level of liquid in the sump to such first predetermined level to deenergize said one pump-driving motor means, and a fourth pressure-actuated switch means in said lower housing subjected to the pressure of liquid in the sump at a second predetermined level of the liquid relative to said lower housing, different from such first predetermined level relative to said lower housing, operatively connected to the other of said pump-driving motor means and operated automatically in response to reduction in the level of liquid in the sump to such second predetermined level relative to said lower housing to effect deenergization of said other motor means.

2. The pressure-actuated control mechanism defined in claim 1, and safety-lockout switch means in the lower housing operatively connected to both of the pump-driving motor means and operable to maintain both pump-driving motor means deenergized in response to reduction of the liquid level in the sump below such second predetermined level of the liquid relative to the lower housing.

3. Pressure-actuated pump control mechanism comprising pressure-responsive means subjected to the pressure of liquid in a sump from which liquid is to be pumped, automatic switch means for energizing a pump, manual switch means operable independently of said automatic switch means for energizing the same pump, safety-lockout switch means, means operatively connecting said safety-lockout switch means both to said automatic switch means and to said manual switch means, and means effecting sequential operation of said automatic switch means and said safety-lockout switch means at different pressures, respectively, by said pressure-responsive means, said automatic switch means at a higher pressure to energize the pump and said safety-lockout switch means at a lower pressure to prevent energization of such pump by either said automatic switch means or said manual switch means when such lower pressure is acting on said pressure-responsive means corresponding to a predetermined low level in the sump lower than sufficient to actuate said automatic switch means for energizing such pump.

4. Pressure-actuated pump control mechanism comprising a bell, a plurality of switch means received in said bell and each having a movable switch-actuating member, a plurality of pump-driving motors controlled by said switch means, respectively, said switch-actuating members being operable to actuate their respective switch means when in substantially the same relationship to such respective switch means, a flexible diaphragm disposed adjacent to said switch-actuating members and sealing the portion of said bell in which said switch means are located, means mounting said pluraltiy of switch means of said bell in side-by-side relationship with their respective switching-actuating members disposed at the same side of said switch means, and a rigid plate overlying said flexible diaphragm, disposed between said flexible diaphragm and said switch-actuating members, and connected to but bridging between and engageable with all of said switch actuating members by movement of said diaphragm toward said switch means and movable toward said switch means by movement of said diaphragm toward said switch means, said mounting means mounting at least two of said switch means spaced different distances from said diaphragm for effecting operation of the respective pump-driving motors controlled thereby in sequence by engagement of said rigid plate with said switch-actuating members of the respective switch means sequentially by progressive deflection of said diaphragm toward said switch means, and the mounting means for each of said switch means including position-adjusting means for bodily shifting its switch means toward or away from said rigid plate for varying the degree of deflection of said diaphragm toward said switch means required to actuate each switch means.

References Cited by the Examiner

UNITED STATES PATENTS

| | | | |
|---|---|---|---|
| 1,952,265 | 3/1934 | Leland | 103—25 |
| 2,526,646 | 10/1950 | Ericson | 103—25 |
| 2,651,995 | 9/1953 | Blackburn | 103—25 |
| 2,741,986 | 4/1956 | Smith | 103—25 |
| 2,812,110 | 11/1957 | Romanowski | 103—11 |
| 2,891,625 | 6/1959 | Hube | 103—25 |
| 2,910,003 | 10/1959 | Kaatz | 103—25 |
| 3,070,021 | 12/1962 | Tutthill | 103—25 |
| 3,133,502 | 5/1964 | Johnson | 103—11 |

MARK NEWMAN, *Primary Examiner.*

W. L. FREEH, *Assistant Examiner.*